W. C. DAVOL, Jr.
Horse-Stalls for Steam Fire-Engine Houses.
No. 144,068. Patented Oct. 28, 1873.
Fig. 1.
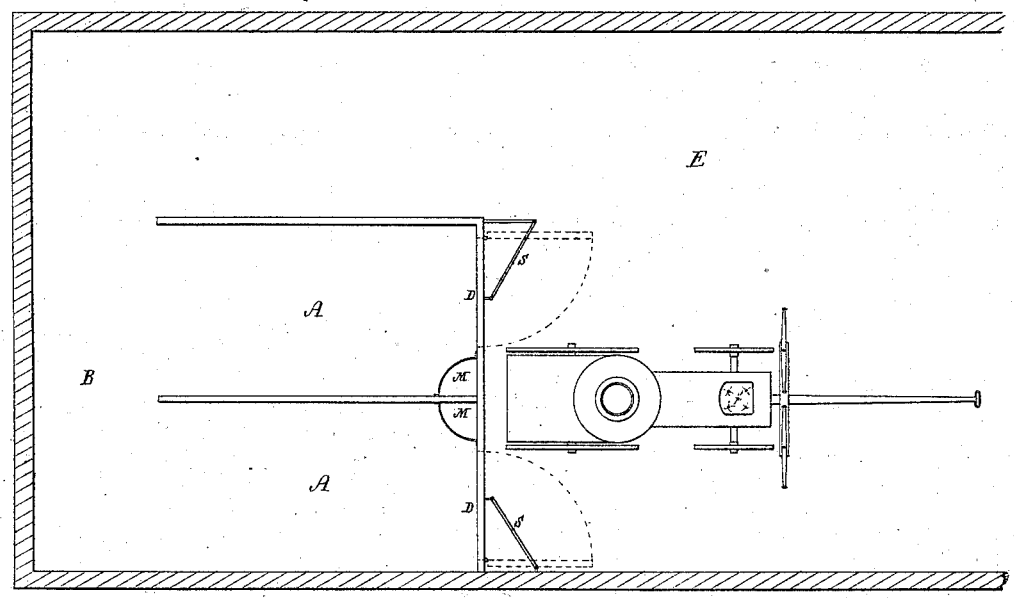
Fig. 3.
Fig. 2.
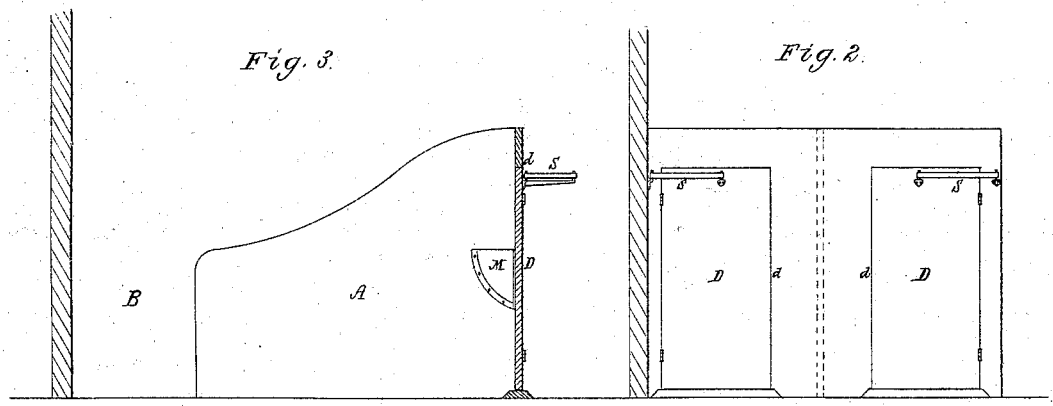
Witnesses
Wm. C. Davol, Jr
by his attorney

UNITED STATES PATENT OFFICE.

WILLIAM C. DAVOL, JR., OF FALL RIVER, MASSACHUSETTS.

IMPROVEMENT IN HORSE-STALLS FOR STEAM FIRE-ENGINE HOUSES.

Specification forming part of Letters Patent No. 144,068, dated October 28, 1873; application filed July 19, 1873.

*To all whom it may concern:*

Be it known that I, WILLIAM C. DAVOL, Jr., of Fall River, of the county of Bristol, of the State of Massachusetts, have invented a new and useful Improvement in the Stables for Steam Fire-Engines; and I do hereby declare the same to be fully described in the following specification and represented in the accompanying drawings, of which—

Figure 1 denotes a plan of a stable with two stalls with my improvement. Fig. 2 is a front view of the stalls, and Fig. 3 a vertical and longitudinal section taken through one of them.

In carrying out my invention, instead of constructing each stall open at its rear end, with its manger at the opposite end and next the end or wall of the stable, so that a horse to be taken from the stall has to back out of it, or stands with his head toward the wall, I arrange the stall so as to open at its end upon an induction-passage, B, arranged between such stall and the end wall of the building; and, furthermore, I arrange the manger M at the end of the stall next the engine-room or space E, and close said end, except in providing it with a doorway, $d$, sufficient for the horse to pass through, such opening being furnished with a door, D, and leading into the space E for stabling the steam fire-engine. The passage B in rear of the stall or stalls opens into a prolongation of it alongside of one of them, and leads into the space E in manner as shown. The horses while in the stalls thus stand with their heads next the doors and toward the engine. To each of the doors and the stalls a spring, S, or other proper device, is to be applied to suddenly pull open the door; and, furthermore, each door should have a locking or bolting apparatus to keep it closed while it may be necessary to have the horses in the stalls. Such fastenings may be provided with mechanism by which they may be simultaneously operated, whether by manual power or by electricity, so as to enable the springs to suddenly open the doors.

On an alarm of fire being given an attendant is to so actuate the door-fastenings as to set open the doors, both of which will immediately open, and the horses, properly trained for the purpose, will immediately pass out of the stalls and take their places alongside of the pole of the engine, thus saving all the time heretofore required to back out or from the stalls the animals, and turn them around, and lead them to the pole.

By a rope stretched across that open end which is next the induction-passage B of each stall, each horse standing with his tail toward the rope will be kept in the stall until the door may be open for him to escape.

I claim—

In the improved steam fire-engine stable, the stall induction-passage B, each stall A, the manger M, the door D, doorway $d$, and the engine-room or space E, combined, constructed, and arranged substantially as described and represented, each stall at its rear end opening into the induction-passage B, as explained.

WM. C. DAVOL, JR.

Witnesses:
R. H. EDDY,
J. R. SNOW.